June 19, 1962     W. R. LASTER     3,039,183
UNIVERSAL JOINT
Filed June 9, 1958     3 Sheets-Sheet 1
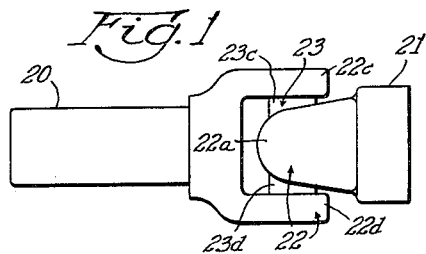
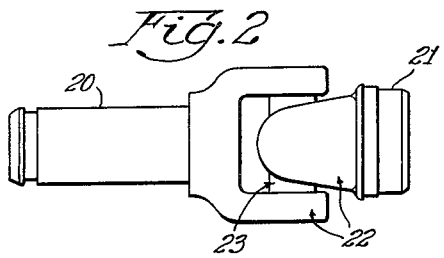
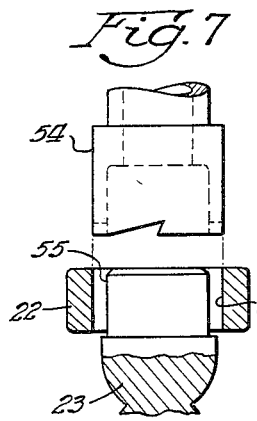
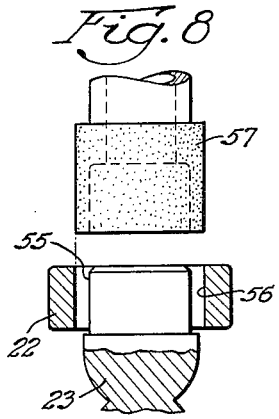
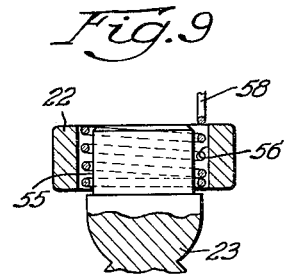
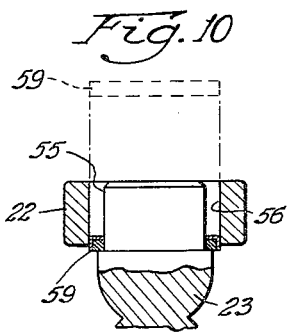
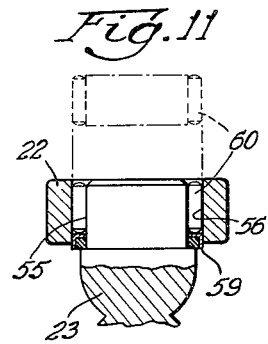
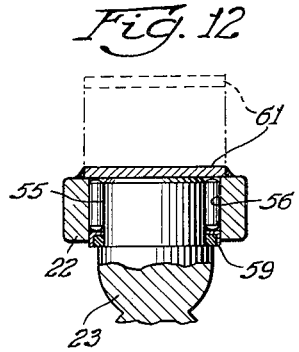
Inventor:
Walter R. Laster
By: Keith J. Blews, Atty.

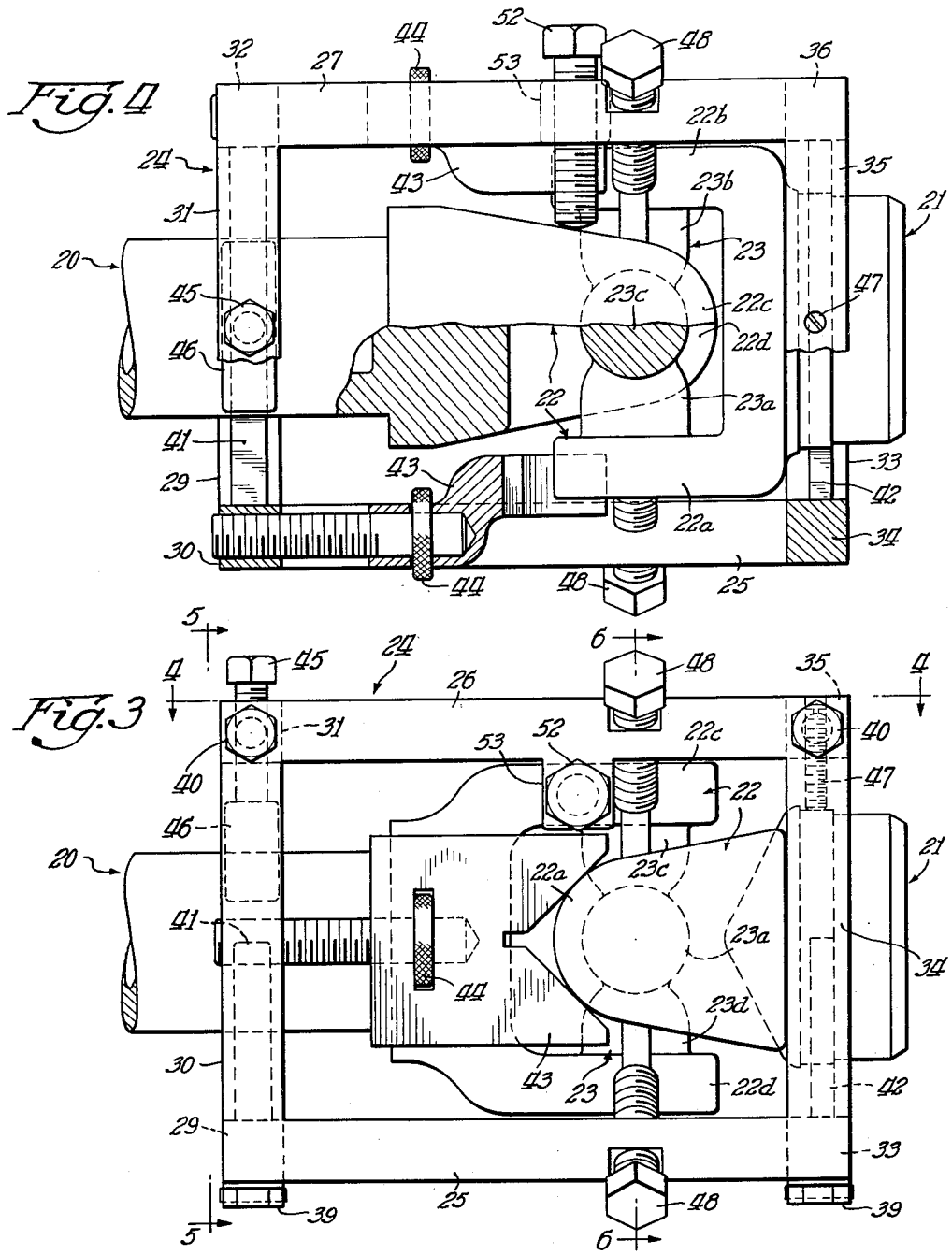

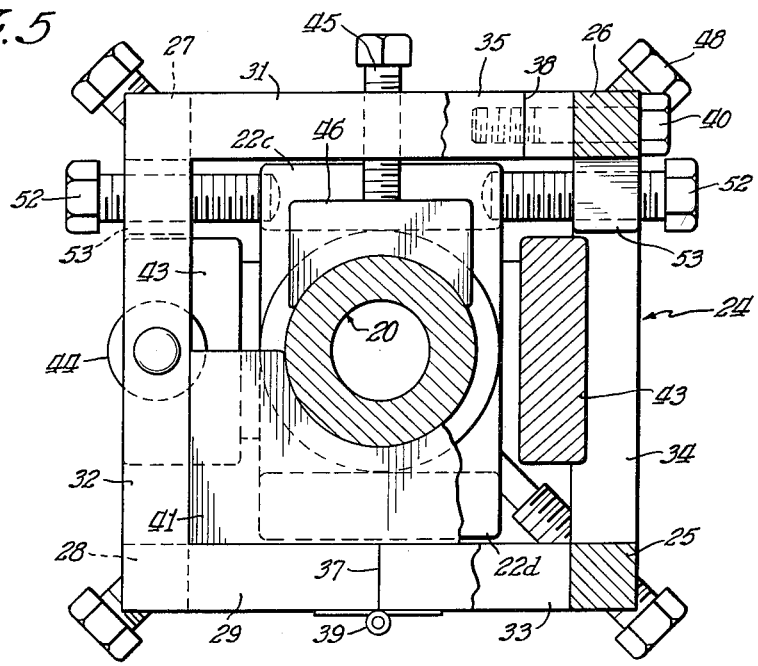
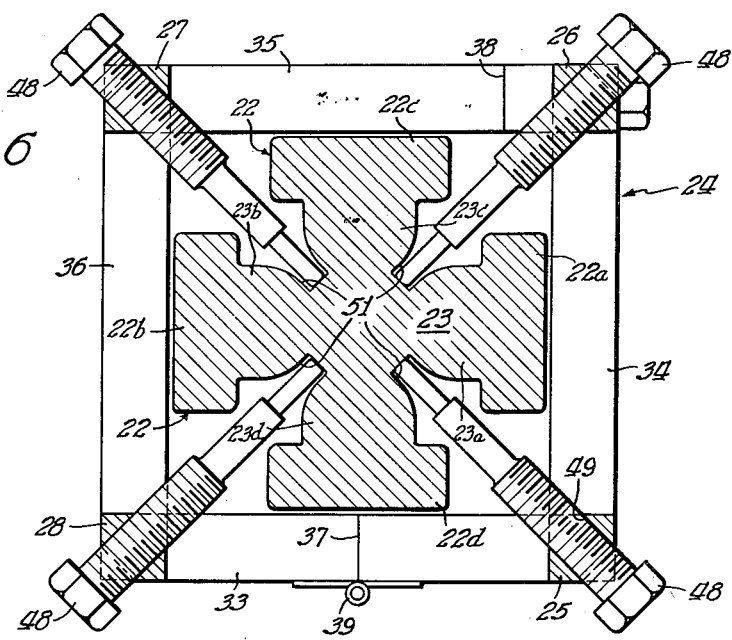

United States Patent Office 3,039,183
Patented June 19, 1962

3,039,183
UNIVERSAL JOINT
Walter R. Laster, Brookfield, Ill., assignor to Borg-Warner Corporation, Chicago, Ill., a corporation of Illinois
Filed June 9, 1958, Ser. No. 740,968
7 Claims. (Cl. 29—416)

This invention relates to universal joints and in particular to a method of manufacturing a Cardan type universal joint which is a well balanced, low cost product.

Experience has demonstrated that when replacing worn parts of a Cardan type universal joint, the balance may be disturbed, thereby causing roughness in operation. This is particularly true if great care is not exercised in replacing the worn parts of the universal joint, and unless expert technicians are employed to do the work, unbalance is very apt to follow. At high speeds, a very slight unbalance produces marked roughness in operation.

It is therefore an object of this invention to provide a method of making a well balanced universal joint at low cost so that when it becomes worn it may be replaced in its entirety instead of being rebuilt. It is contemplated that the universal joint preferably is of such construction that it may not be disassembled for repairs after it has been manufactured.

It is a further object of this invention to provide an improved method of making a universal joint which has a total cost comparable with the cost of repairing current types of universal joints which require rebuilding after long service.

It is another object to provide an improved method of making a universal joint which for a given overall diameter has journals and bearings that are larger than those in current types, thereby providing a stronger and longer lived universal joint.

The invention consists of the novel methods to be hereinafter described and claimed for carrying out the above stated objects and such other objects as will be apparent from the following description of a preferred manner of exercising the invention, illustrated with reference to the accompanying drawings, wherein:

FIG. 1 is a side view of an integral shell casting of a universal joint;

FIG. 2 is a similar view of the shell casting after the spline and yoke ends have been machined;

FIG. 3 is an elevational view of the shell casting shown in FIG. 2, locked in a jig;

FIG. 4 is a view taken on line 4—4 of FIG. 3;

FIG. 5 is a view taken on line 5—5 of FIG. 3;

FIG. 6 is a cross-sectional view taken on line 6—6 of FIG. 3;

FIG. 7 is a fragmentary view of one end of the cross and its associated yoke arm which are parts of the casting shown in FIG. 1, showing inner and outer bearing races formed by a trepanning operation, and a fragmentary view of the trepanning tool;

FIG. 8 is the same fragmentary view of one end of the cross and its associated yoke arm as shown in FIG. 7, and a fragmentary view of a burnishing tool;

FIG. 9 is the same fragmentary view of one end of the cross and its associated yoke arm as shown in FIG. 7, with a fragmentary view of an induction hardening device in position between the inner and outer bearing races;

FIG. 10 is a fragmentary view of one end of the cross and its associated yoke arm as shown in FIG. 7, and an oil seal in position between the bearing races;

FIG. 11 is the same view as shown in FIG. 10 with needle bearings in position between the races; and FIG. 12 is the same view as shown in FIG. 11, with a bearing cap in position.

Like characters of reference designate like parts in the several views.

Referring now to the drawings and FIG. 1 in particular, the shell casting of the universal joint, which is an integral piece and which is the part from which the various basic operating parts of a completed universal joint are formed in accordance with the invention, has coaxially disposed spline and yoke shafts or ends 20 and 21 respectively. Each of the ends 20 and 21 has a pair of oppositely disposed yoke arms 22 extending therefrom which are cast integrally with a four ended cross or spider 23. More specifically, end 21 is formed with yoke arms 22a and 22b which are at 180 degrees with respect to each other from the longitudinal center line of end 21 and which together form a yoke. The end 20, more specifically, is formed with yoke arms 22c and 22d similar to 22a and 22b. The spider 23 is formed with four arms 23a, 23b, 23c and 23d which are at 90 degrees with respect to each other and which are respectively integral with the yoke arms 22a, 22b, 22c, and 22d (see FIG. 6).

The casting illustrated in FIG. 1 is machined externally as shown in FIG. 2 and is then locked in a jig 24 which has side rails 25, 26, 27, and 28 and end rails 29, 30, 31, 32, 33, 34, 35 and 36. The end rails 29 and 33 are severed at areas 37, and end rails 31 and 35 are severed at areas 38. Hinges 39 connect the severed parts of the end rails 29 and 33. Bolts 40 connect together the severed parts of end rails 31 and 35 thereby locking the casting within the jig 24. The spline and yoke ends 20 and 21 respectively rest on supports 41 and 42. A pair of movable clamps 43 are provided with adjusting screws 44 for moving the clamps 43 into engagement with the ends of the yoke arms 22 that are carried by the yoke end 21 and moving the universal join casting against the face of the support 42. A screw 45 carrying a clamp 46 at its end is provided for holding the spline end 20 of the universal joint against the support 41 and a screw 47 is provided to hold the yoke end 21 of the universal joint in rigid engagement with the support 42. Additional means for firmly locking the universal joint casting within the jig are provided by studs 48 threaded through bores 49 which extend obliquely through rails 25, 26, 27, and 28 to engage crotches 51 of the cross 23. Bolts 52 threaded through blocks 53 which are attached to the side rails 26 and 27 are also provided to engage the sides of one of the yoke arms 22 of the spline end 20 as additional support means.

In FIGS. 7 through 12, views depicting successive steps in the manufacture of a universal joint from the integral casting previously described are shown. With the casting being firmly held in the jig as above described, a trepanning tool 54 is used to cut away material between the ends of one of the yoke arms 22 and the corresponding end of the cross 23 (the yoke arm 22a and spider end 23a, for example) which establishes articulation therebetween and forms inner and outer cylindrical races 55 and 56 respectively. Following this operation, a burnishing tool 57 is used to polish the surfaces of the inner and outer races 55 and 56 respectively. An electric induction heating tool 58 is then used to heat the surfaces of the races 55 and 56 after which they are quenched in accordance with conventional practice for hardening them. Following this, a bearing seal 59 is placed in position between the races 55 and 56. Needle bearings 60 are then inserted between the races 55 and 56 and following this, a bearing cap 61 is welded in position over the needle bearings.

The same operations are performed on the yoke arms 22b, 22c, and 22d and the spider arms 23b, 23c and 23d to provide the same type of outer and inner races 55 and 56 formed between these yoke arms and spider arms. It will be apparent that the jig illustrated in FIGS. 3, 4, 5 and 6 may be suitably mounted so that any of these operations on the yoke and cross arms may be simultaneously performed. For example, the trepanning operation may be performed simultaneously on the yoke arms 22a, 22b, 22c and 22d, and the same is true with respect to each of the other operations. In addition, it is apparent that any successive one of the operations may be performed on one of the yoke arms 22a, 22b, 22c and 22d while earlier operations are being performed on others of the yoke arms. The shafts 20 and 21 may be machined to provide them with the suitable splines or screw openings for attachment to drive and driven shafts (not shown) at any time, that is, before, during, or after having been located in the jig.

From the foregoing it is apparent that a universal point may be made from an integral casting by the use of a trepanning tool by means of which materials from the casting is routed out in the areas at the ends of the cross, thereby separating the ends of the cross from the ends of their respective yoke arms and leaving a space therebetween for the insertion of needle bearings.

More specifically, the steps include casting an integral universal joint, machining the spline and yoke ends of the universal joint casting, and securing it firmly at various points within a jig so that the trepanning operation may be performed at each end of the cross without danger of the component parts shifting when the cross is separated from the yoke arms as a result of this trepanning operation. It is also apparent that from this trepanning operation inner and outer bearing races are produced for receiving the needle bearings. Following this operation, the races are burnished and then surface hardened by using an induction heating tool fitting between the races. This operation is then followed by placing an oil seal at the bottom of the space between two races. Lubricant is then inserted above the oil seal which is followed by the insertion of needle bearings. A bearing cap is then secured over the ends of the needle bearings and when the steps just enumerated have been performed with respect to each one of the cross ends, a universal joint ready for installation in a drive line has been manufactured.

Due to the fact that the universal joint herein described is manufactured from an integral casting of a cross and yokes which are made articulate by cutting away material from the casting at the cross ends, larger journals and bearings may be provided for additional strength for a given universal joint size. This is so, because if the cross ends were made removable for assembly, as is the case in some current types, the body of the cross would of necessity be larger than an integral cross in order to give it comparable strength; if on the other hand, the cross were made as an integral unit, as is also done in some current types, then articulating means for the cross ends, such as bearing caps bolted to the yoke arms, would be employed, which would of necessity require yokes of an increased size as against integral yokes for receiving the cross ends. It is apparent that as between universal joints of the Cardan type of the same size, the one with an integral cross and integral yokes will of necessity be stronger than one with either a separable cross or separable yokes.

While I have described my invention in connection with certain specific methods, constructions and arrangements, it is to be understood that this is by way of illustration and not by way of limitation and the scope of my invention is defined solely by the appended claims which should be construed as broadly as the prior art will permit.

I claim:

1. A method of making a universal joint comprising the steps of, forming a casting of a cross member having a pair of yoke arms on each side thereof connected to the ends of the said cross member, a yoke shaft fixed to each pair of said yoke arms, machining the said yoke shafts in coaxial alignment, clamping the said machined yoke shafts in a fixture, and trepanning the areas at the ends of the said cross member to separate the said cross member from the said yoke arms and thereby providing articulation between the said cross member and the said yoke arms.

2. A method of making a universal joint comprising the steps of, forming a casting of a cross member having a pair of yoke arms on each side thereof connected to the ends of the said cross member, a yoke shaft fixed to each pair of said yoke arms, machining the said yoke shafts in coaxial alignment, clamping the said machined yoke shafts in a fixture, and trepanning the areas at the ends of the said cross member to separate the said cross member from the said yoke arms and thereby form inner and outer bearing races therebetween.

3. A method of making a universal joint comprising the steps of, forming a casting of a cross member having a pair of yoke arms on each side thereof connected to the ends of the said cross, a yoke shaft fixed to each pair of said yoke arms, machining the said yoke shafts in coaxial alignment, clamping the said machined yoke shafts in a fixture, trepanning the areas at the ends of the said cross member to separate the said cross member from the said yoke arms and thereby providing articulation between the said cross member and the said yoke arms and forming inner and outer bearing races therebetween, burnishing the said races, induction hardening the said races, inserting oil sealing rings at the inner ends of the said races, inserting lubricant between the said races, inserting needle bearings between the said races, and affixing a cap over the ends of the said needle bearings.

4. A method of making a universal joint comprising the steps of forming an integral member having a four armed spider and a pair of yokes each connected across said spider to opposite arms thereof, a yoke shaft fixed to one each of said pair of yokes, machining the said yoke shafts in coaxial alignment, clamping the said machined yoke shafts in a fixture, and trepanning through said yokes longitudinally of said spider arms to thereby separate the spider from the yokes.

5. A method of making a universal joint comprising the steps of forming an integral member having a four armed spider and a pair of yokes each connected across said spider to opposite arms thereof, a yoke shaft fixed to one each of said pair of yokes, machining the said yoke shafts in coaxial alignment, clamping the said machined yoke shafts in a fixture, and trepanning through said yokes longitudinally of said spider arms to remove annular pieces of said member and thereby separate the spider from the yokes and provide inner and outer bearing races therebetween, and finishing the said races and inserting bearing means between said races.

6. A method of making a universal joint comprising the steps of forming an integral member having a four armed spider and a pair of yokes extending across said spider and connected to opposite ends of said spider arms, a yoke shaft fixed to one each of said pair of yokes, machining the said yoke shafts in coaxial alignment, clamping the said machined yoke shafts in a fixture, providing means in said fixture for securing the said spider in fixed relationship with respect to said pair of yokes, securing said spider in said fixed relationship with respect to said pair of yokes by said means, and routing out an annular groove at the end of each of said spider arms and extending longitudinally thereof to thereby separate the spider from the yokes and to provide inner and outer races therebetween, and inserting bearing means between said inner and outer races in contact with both races.

7. A method of making a universal joint comprising the steps of forming an integral casting having a four armed spider and a pair of yokes extending across said spider and connected to opposite ends of said spider arms, a yoke shaft fixed to one each of said pair of yokes, machining the said yoke shafts in coaxial alignment, clamping the said machined yoke shafts in a fixture, providing means in said fixture for securing the said spider in fixed relationship with respect to said pair of yokes, securing said spider in said fixed relationship to said pair of yokes by said means, routing out annular spaces through said casting by trepanning through the ends of said yokes along the longitudinal axes of said spider arms to thereby separate the spider from the yokes and to provide coaxial inner and outer bearing races therebetween, finishing and hardening said inner and outer bearing races and inserting needle bearings between said bearing races.

References Cited in the file of this patent

UNITED STATES PATENTS

| | | |
|---|---|---|
| 1,226,689 | Nedoma | May 22, 1914 |
| 1,477,570 | Lehmann | Dec. 18, 1923 |
| 1,854,897 | Ganster | Apr. 19, 1932 |
| 1,993,357 | Braun et al. | Mar. 5, 1935 |
| 2,038,474 | Brown | Apr. 21, 1936 |
| 2,038,475 | Brown | Apr. 21, 1936 |
| 2,151,292 | Brickman | Mar. 21, 1939 |
| 2,184,183 | Fykse | Dec. 19, 1939 |
| 2,209,855 | Slaught | July 30, 1940 |
| 2,488,848 | Carullo | Nov. 22, 1949 |